United States Patent
Duranleau-Hendrickx et al.

(10) Patent No.: US 12,313,010 B2
(45) Date of Patent: May 27, 2025

(54) SYSTEMS AND METHODS FOR ADJUSTING A MODULATION CHARACTERISTIC OF A BLEED-OFF VALVE OF A GAS TURBINE ENGINE

(71) Applicant: PRATT & WHITNEY CANADA CORP., Longueuil (CA)

(72) Inventors: Louis Duranleau-Hendrickx, Montreal (CA); Daniel Coutu, Longueuil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 90 days.

(21) Appl. No.: 18/130,514

(22) Filed: Apr. 4, 2023

(65) Prior Publication Data
US 2024/0337219 A1   Oct. 10, 2024

(51) Int. Cl.
    F02C 9/18    (2006.01)
(52) U.S. Cl.
    CPC ............ F02C 9/18 (2013.01); F05D 2260/80 (2013.01); F05D 2260/83 (2013.01); F05D 2270/301 (2013.01); F05D 2270/304 (2013.01); F05D 2270/71 (2013.01); F05D 2270/802 (2013.01)
(58) Field of Classification Search
    CPC .......... F05D 2240/58; F05D 2270/101; F05D 2270/102; F05D 2260/80; F05D 2260/83; F05D 2270/301; F05D 2270/304; F05D 2270/71; F05D 2270/802; F02C 3/06; F02C 6/08; F02C 9/18
    See application file for complete search history.

(56) References Cited

U.S. PATENT DOCUMENTS

| | | | |
|---|---|---|---|
| 5,313,778 A * | 5/1994 | Sweet | F02C 9/18 60/772 |
| 9,797,314 B2 | 10/2017 | Hillel et al. | |
| 9,810,158 B2 | 11/2017 | Foutch et al. | |
| 10,060,358 B2 | 8/2018 | Tiwari et al. | |
| 11,359,546 B2 | 6/2022 | Lam | |
| 2021/0270190 A1 | 9/2021 | Duranleau-Hendrickx | |
| 2021/0348619 A1* | 11/2021 | DeFelice | F04D 27/023 |
| 2023/0323673 A1* | 10/2023 | Faraone | E04F 11/1834 52/126.4 |

FOREIGN PATENT DOCUMENTS

EP     0298895 A2    1/1989

OTHER PUBLICATIONS

European Search Report issued in counterpart EP application No. 24166491.1 on Aug. 29, 2024.

* cited by examiner

Primary Examiner — Todd E Manahan
Assistant Examiner — Rodolphe Andre Chabreyrie
(74) Attorney, Agent, or Firm — NORTON ROSE FULBRIGHT CANADA LLP

(57) ABSTRACT

Methods and systems for adjusting a modulation characteristic of a bleed-off valve of a gas turbine engine are described. The method comprises obtaining a first setpoint configuration associated with a first modulation characteristic of the bleed-off valve, obtaining operating conditions of the gas turbine engine, determining an adjustment factor based on the first setpoint configuration and the operating conditions of the gas turbine engine, and adjusting the bleed-off valve to a second setpoint configuration associated with a second modulation characteristic based on the first setpoint configuration and the adjustment factor, the second modulation characteristic being different from the first modulation characteristic.

13 Claims, 9 Drawing Sheets

SYSTEMS AND METHODS FOR ADJUSTING A MODULATION CHARACTERISTIC OF A BLEED-OFF VALVE OF A GAS TURBINE ENGINE

TECHNICAL FIELD

The present disclosure relates generally to gas turbine engines, and more particularly to adjustment of bleed-off valves in gas turbine engines.

BACKGROUND OF THE ART

During maintenance procedures, the adjustment of a modulation characteristic associated with a setpoint (or "closing point") of a bleed-off valve is typically effected using iterative techniques. For example, adjusting a bleed-off valve setpoint may require the engine to be run with the bleed-off valve adjusted in a certain way for providing a certain modulation in its operation, check the results, and iteratively re-adjust the bleed-off valve setpoint until the bleed-off valve operates with modulation characteristics within the required specification. This leads to increased maintenance time, costs and fuel burnt to perform the iterative procedure for adjusting the setpoint of a bleed-off valve.

While existing techniques for adjusting a modulation characteristic of a bleed-off valve are suitable for their purposes, improvements remain desirable.

SUMMARY

In accordance with a broad aspect, there is provided a method for adjusting a modulation characteristic of a bleed-off valve of a gas turbine engine, the method including obtaining a first setpoint configuration associated with a first modulation characteristic of the bleed-off valve, obtaining operating conditions of the gas turbine engine, determining an adjustment factor based on the first setpoint configuration and the operating conditions of the gas turbine engine, and adjusting the bleed-off valve to a second setpoint configuration associated with a second modulation characteristic based on the first setpoint configuration and the adjustment factor, the second modulation characteristic being different from the first modulation characteristic.

The method may include any of the following features, in any combinations.

In some embodiments, the adjusting to the second setpoint configuration of the bleed-off valve includes adjusting an adjustment device of the bleed-off valve.

In some embodiments, the adjusting of the adjustment device includes at least one of: changing an orifice class of the bleed-off valve, changing a seat class of the bleed-off valve, turning an adjustment screw on the bleed-off valve, changing a classified baffle of the bleed-off valve, and changing a spring stiffness of the bleed-off valve.

In some embodiments, the obtaining the first setpoint configuration and the obtaining of the operating conditions of the gas turbine engine includes testing the gas turbine engine in a test cell.

In some embodiments, the method further includes outputting the second setpoint configuration associated with the second modulation characteristic.

In some embodiments, the bleed-off valve is positioned in a compressor section of the gas turbine engine, and is configured for removing excess air pressure from the compressor section.

In some embodiments, the determining of the adjustment factor includes using a plurality of multi-dimensional maps associated with the operating conditions of the gas turbine engine, the plurality of multi-dimensional maps defining the adjustment factor as a function of the operating conditions of the gas turbine engine.

In some embodiments, each multi-dimensional map of the plurality of multi-dimensional maps is associated with a set of the operating conditions of the gas turbine engine.

In some embodiments, each multi-dimensional map of the plurality of multi-dimensional maps is a two-dimensional map including a plurality of response surfaces, each response surface of the plurality of response surfaces associated with one corresponding adjustment factor.

In some embodiments, the operating conditions of the gas turbine engine comprise engine inlet pressure, engine inlet temperature, and rotational engine speed.

In some embodiments, the determining of the adjustment factor includes obtaining an adjustment target, determining an estimated adjustment increment based on the first setpoint configuration and the operating conditions of gas turbine engine, comparing the estimated adjustment increment to the adjustment target to obtain a correction factor, when a condition associated with the estimated adjustment increment is not satisfied adjusting the estimated adjustment increment based on the correction factor to produce a modified estimated adjustment increment, and updating the correction factor based on the modified estimated adjustment increment, and when the condition associated with the estimated adjustment increment is satisfied, issuing a signal indicative of the adjustment factor.

In some embodiments, the adjustment target is determined based on the operating conditions of the gas turbine engine.

In some embodiments, the method further includes obtaining an adjustment target, comparing the first setpoint configuration to the adjustment target, and when a condition associated with the first setpoint configuration is not satisfied, issuing a warning signal to a controller associated with the gas turbine engine.

In accordance with another broad aspect, there is provided a method for testing operation of a gas turbine engine, the method including obtaining a current setpoint configuration associated with a current modulation characteristic of a bleed-off valve, operating the gas turbine engine in a test cell, obtaining operating conditions of the gas turbine engine, determining an adjusted modulation characteristic based on the current modulation characteristic and the operating conditions of the gas turbine engine, and adjusting the bleed-off valve to the adjusted modulation characteristic.

The method may include any of the following features, in any combinations.

In some embodiments, the method further includes validating the adjusted modulation characteristic with the operating conditions of the gas turbine engine.

In some embodiments, the method further includes calibrating an adjustment estimator based on at least one of experimental data and numerical data.

In some embodiments, the calibrating of the adjustment estimator includes obtaining the at least one of the experimental data and the numerical data, and determining adjusted calibration data based on the at least one of the experimental data and numerical data.

In accordance with yet another broad aspect, there is provided a system for adjusting a modulation characteristic of a bleed-off valve of a gas turbine engine, the system including a processing unit, and a non-transitory computer-readable medium having stored thereon program code executable by the processing unit for calibrating an adjustment estimator from at least one of experimental data and numerical data, obtaining a first setpoint configuration associated with a first modulation characteristic of the bleed-off valve, obtaining operating conditions of the gas turbine engine, determining an adjustment factor based on the first setpoint configuration and the operating conditions of the gas turbine engine, and outputting a second setpoint configuration of the bleed-off valve associated with a second modulation characteristic based on the first setpoint configuration and the adjustment factor, the second modulation characteristic being different from the first modulation characteristic.

The system may include any of the following features, in any combinations.

In some embodiments, for the determining of the adjustment factor, the program code is further executable for retrieving a plurality of multi-dimensional maps associated with the operating conditions of the gas turbine engine, the plurality of multi-dimensional maps defining the adjustment factor as a function of the operating conditions of the gas turbine engine.

In some embodiments, for the determining of the adjustment factor, the program code is further executable for obtaining an adjustment target, determining an estimated adjustment increment based on the first setpoint configuration and the operating conditions of gas turbine engine, comparing the estimated adjustment increment to the adjustment target to obtain a correction factor, when a condition associated with the estimated adjustment increment is not satisfied, adjusting the estimated adjustment increment based on the correction factor to produce a modified estimated adjustment increment, and updating the correction factor based on the modified estimated adjustment increment, and when the condition associated with the estimated adjustment increment is satisfied, issuing a signal indicative of the adjustment factor.

Features of the systems, devices, and methods described herein may be used in various combinations, in accordance with the embodiments described herein. More particularly, any of the above features may be used together, in any combination.

BRIEF DESCRIPTION OF THE DRAWINGS

Reference is now made to the accompanying figures in which.

DETAILED DESCRIPTION

There are described herein methods and systems for adjusting a modulation characteristic of a bleed-off valve (BOV) of a gas turbine engine. A BOV is a valve that removes excess air pressure generated by increasing the flow through one or more upstream stages of an engine compressor. The BOV is typically opened at low engine speed and closes (by pneumatic or hydraulic) at higher engine speed/power. The gas turbine engine performance and operability is sensitive to a modulation characteristic associated with a BOV setpoint (also referred to as "closing point") and therefore, the verification and adjustment of this setpoint associated with a modulation characteristic of the BOV needs to be performed. The verification and adjustment of the modulation characteristic of the BOV can be effected during maintenance procedures, for example when performing ground-based tests on the gas turbine engine in a test cell. The modulation characteristic defines a behavior of the BOV during operation. In some embodiments, the modulation characteristic is set depending on expected operating conditions of the gas turbine engine 100.

Figure 1:
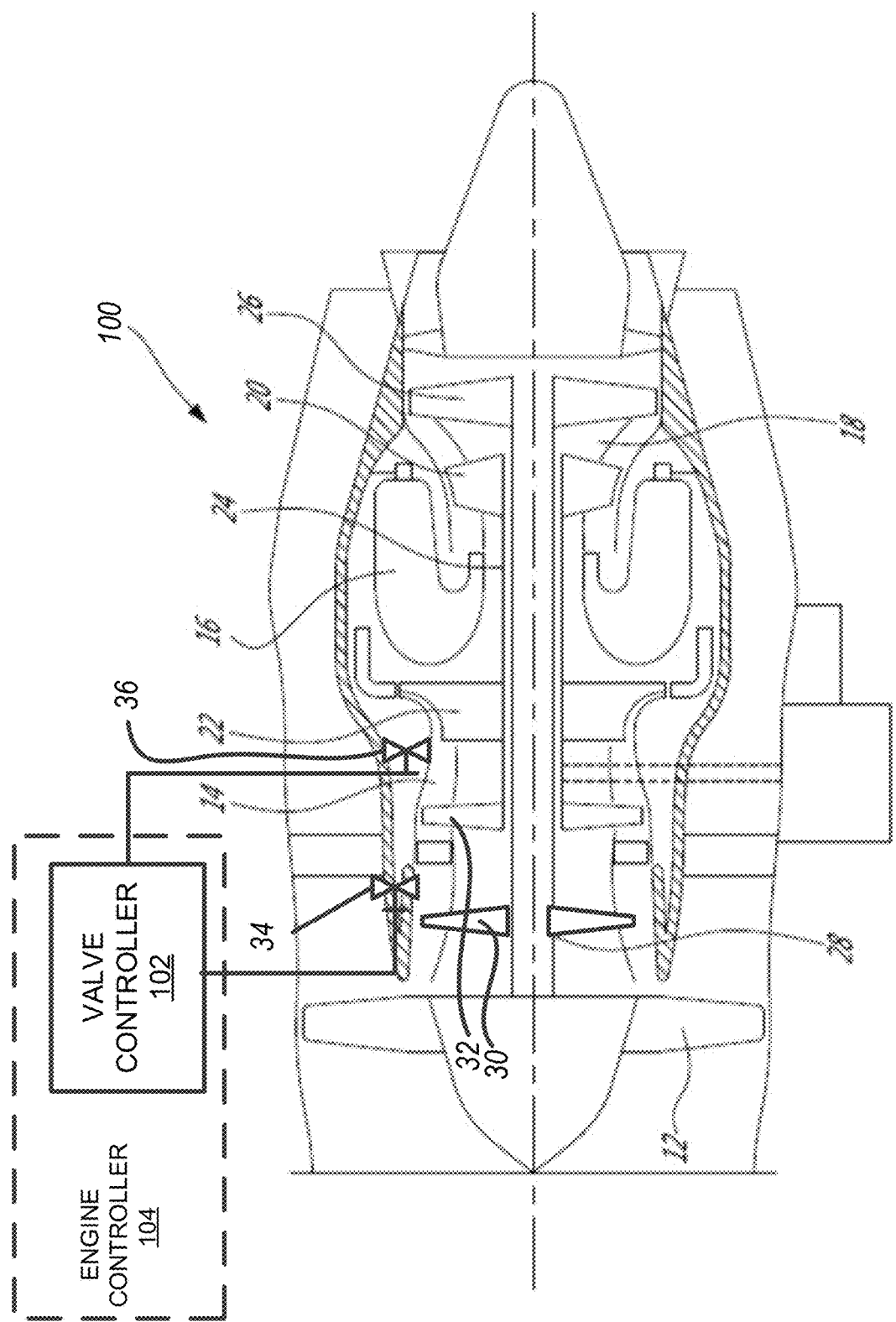
FIG. 1 is a schematic cross-sectional view of an example gas turbine engine.

The methods and systems of adjusting a modulation characteristic of a BOV as described herein are applicable to a gas turbine engine having one or more spools. FIG. 1 illustrates an example embodiment of a gas turbine engine 100 of a type provided for use in subsonic flight, generally comprising in serial flow communication, a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. High pressure rotor(s) 20 of the turbine section 18 are drivingly engaged to high pressure rotors 22 and 32 of the compressor section 14 through a high pressure shaft 24. Low pressure rotors 26 of the turbine section 18 are drivingly engaged to the fan rotor 12 and to low pressure rotors 30 of the compressor section 14 through a low pressure shaft 28 extending within the high pressure shaft 24 and rotating independently therefrom.

Although illustrated as a turbofan engine, the gas turbine engine 100 may alternatively be another type of engine, for example a turboshaft engine, also generally comprising in serial flow communication a compressor section, a combustor, and a turbine section. A turboprop engine or turbojet may also apply. In addition, although the engine 100 is described herein for flight applications, it should be understood that other uses, such as industrial or the like, may apply.

In the example of FIG. 1, a valve 34 is positioned downstream from the low pressure rotor 30 of the compressor section 14, and is referred to herein as a low pressure compressor (LPC) BOV. A valve 36 is positioned between the high pressure rotors 32 and 22 (i.e. inter-stage of a high pressure compressor) and is referred to herein as a high pressure compressor (HPC) BOV. Generally, valves 34 and 36 may be positioned anywhere along their respective compressor's axial location. In some embodiments, only one of valves 34, 36 is present on the gas turbine engine 100. In some embodiments, more than one valve 34 and/or more than one valve 36 is present on the gas turbine engine 100.

Control of the valves 34, 36 is effected by a valve controller 102 operatively connected thereto. In some embodiments, the valve controller 102 forms part of an engine controller 104, which may be a full-authority digital engine controls (FADEC) or other similar device, including an electronic engine control (EEC), an engine control unit (ECU) and the like. Alternatively, the valve controller 102 can be wholly or partly external to the engine controller 104 and communicatively coupled therewith.

In one embodiment, each one of the valves 34, 36 includes a passage adapted for receiving an adjustment device therein, such as an adjustment screw having a through orifice extending therein. The modulation characteristic associated with the setpoint of the bleed-off valves 34, 36 can be adjusted by selecting an adjustment device to be installed in the passage, the adjustment screw being selected among different adjustment screws having different orifice sizes/configurations. In one embodiment, the orifice sizes/configurations provide adjustment increments and are identified as "classes". Other adjustment devices are contemplated for different types of BOV. As such, adjusting of the adjustment device can include changing an orifice class of the bleed-off valve, changing a seat class of the bleed-off valve, turning an adjustment screw on the bleed-off valve, changing a classified baffle of the bleed-off valve, and/or changing a spring stiffness of the bleed-off valve.

Figure 2:
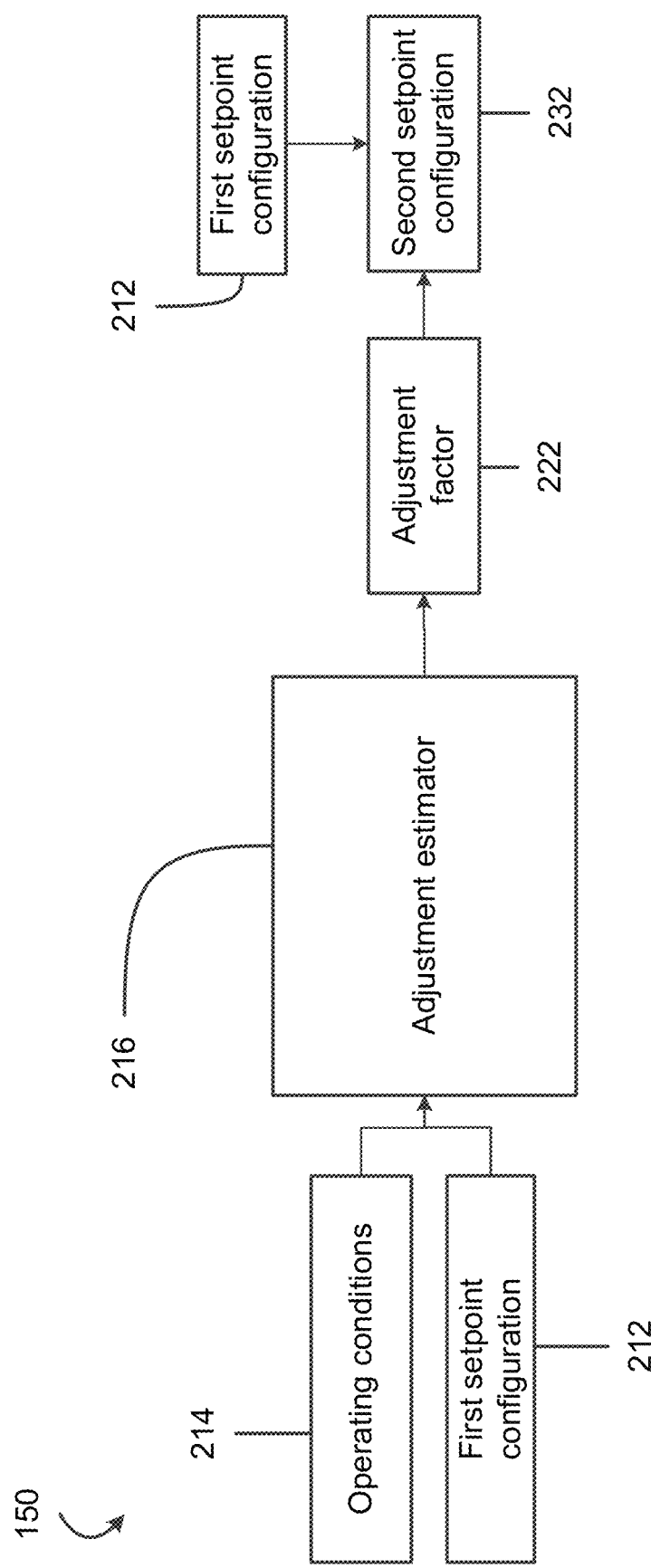
FIGS. 2-7 are flowcharts illustrating example methods for adjusting a modulation characteristic of a bleed-off valve of a gas turbine engine.
Figure 3:
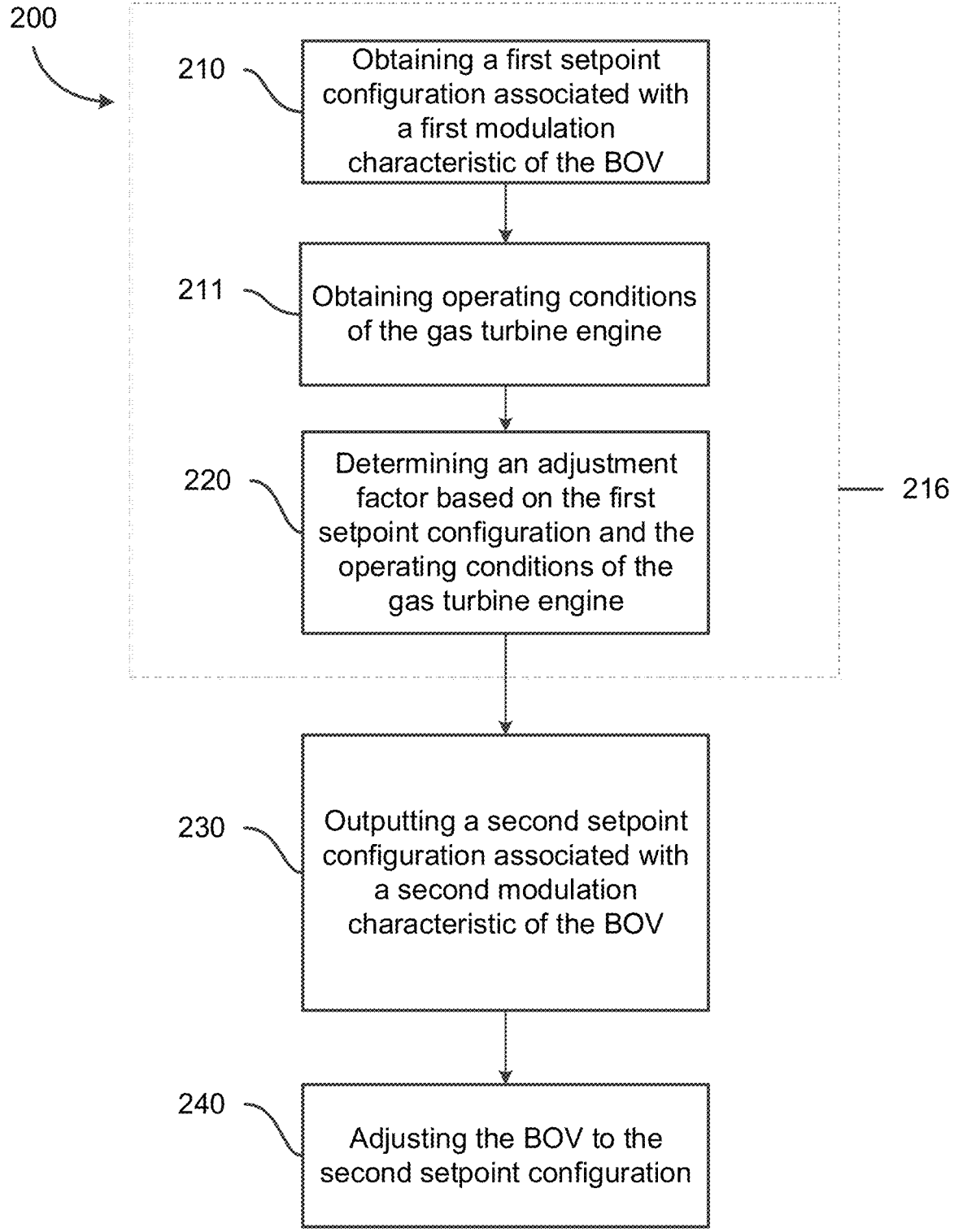

Referring to FIGS. 2 and 3, there is generally described a method 200 for adjusting a modulation characteristic of a BOV of the gas turbine engine 100. At step 210, a first setpoint configuration 212 (or current setpoint configuration) associated with a first modulation characteristic of the BOV is obtained at an adjustment estimator 216. At step 211, operating conditions 214 of the gas turbine engine 100 are obtained at the adjustment estimator 216. The current setpoint configuration 212 and the operating conditions of the gas turbine engine 100 can be obtained by testing the gas turbine engine 100 in a test cell. The current setpoint configuration 212 and the other BOV setpoint configurations about to be described are expressed in various ways in different embodiments. In one embodiment, the current setpoint configuration 212 is expressed as a pressure at a given rotational engine speed. The operating conditions 214 of the gas turbine engine 100 include, and are not limited to, altitude, engine inlet temperature, engine inlet pressure, and rotational engine speed. Other operating conditions of the gas turbine engine 100, such an accessory gearbox load, customer bleed, condition of a bypass door, fuel flow rate, engine spool power, engine spool torque, BOV discharge cavity temperature, electronic position feedback and fuel specific gravity, are contemplated to be obtained by the adjustment estimator 216.

At step 220, the adjustment estimator 216 determines an adjustment factor 222 based on the current setpoint configuration 212 and the operating conditions 214 of the gas turbine engine 100. The adjustment estimator 216 uses one or more estimation methods to determine the adjustment factor 222. The estimation methods include, and are not limited to, partial derivatives approach, multi-dimensional response surfaces, polynomial response curve, gradient vector descent approach, neural network trained with experimental data, and pre-computed lookup tables. Exemplary estimation methods will be described further below.

At step 230, the adjustment estimator 216 outputs a second setpoint configuration 232 (or final setpoint configuration) associated with a second modulation characteristic based on the current setpoint configuration 212 and the adjustment factor 222. The second modulation characteristic is different from the first modulation characteristic.

At step 240, the BOV is adjusted to the final setpoint configuration 232 in order to have the second modulation characteristic.

Figure 4:
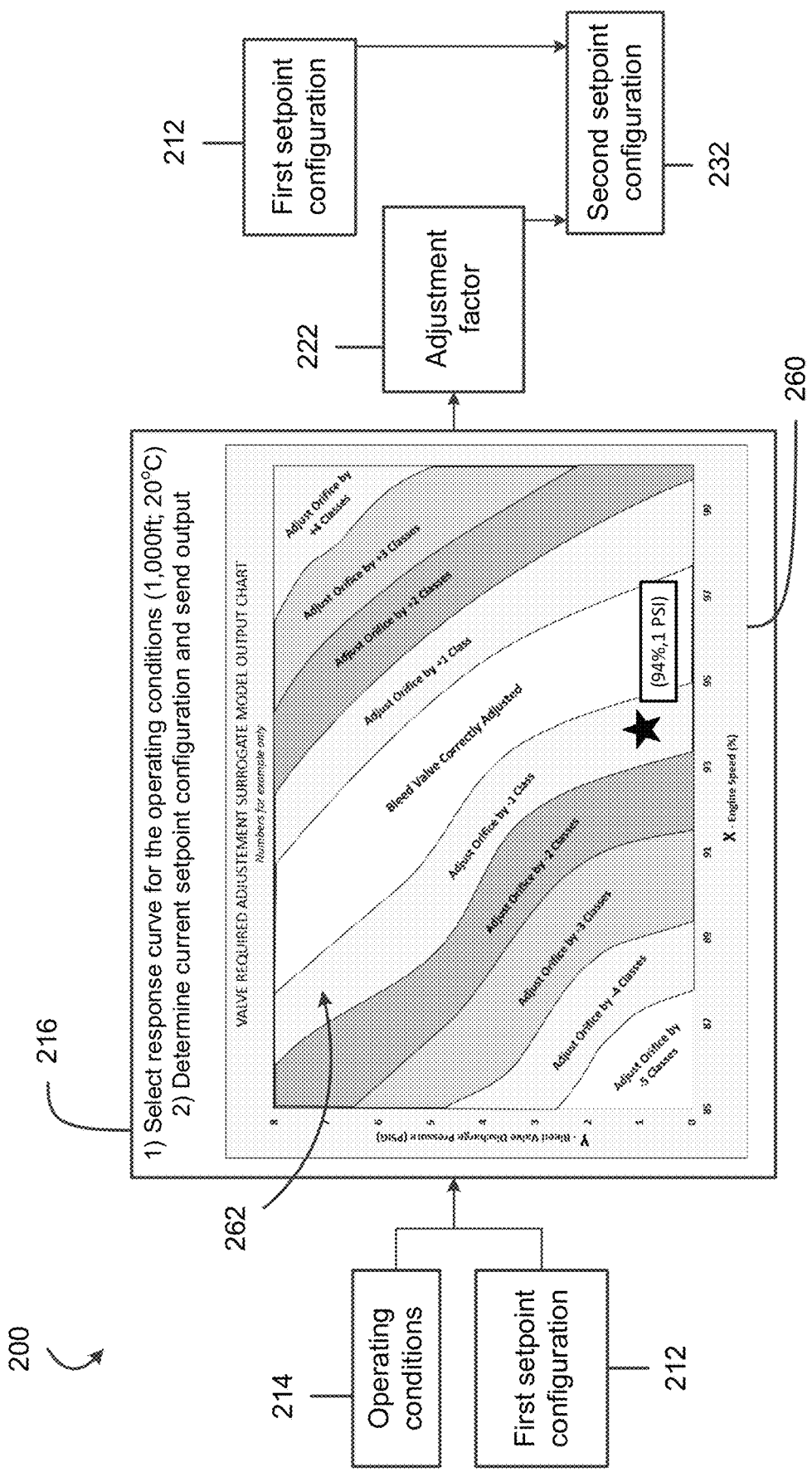

Referring to FIG. 4, an example embodiment of the adjustment estimator 216 is illustrated. The adjustment estimator 216 retrieves multi-dimensional maps 260 associated with the operating conditions 214 of the gas turbine engine 100. More particularly, the each map 260 is associated with a set of operating conditions 214 of the gas turbine engine 100. For example, the illustrated map 260 is associated with the following operating conditions: altitude 1,000 ft; and engine inlet temperature 20° C. Each map 260 defines the adjustment factor 222 as a function of the operating conditions 214 of the gas turbine engine 100. In the illustrated multi-dimensional map 260, the map 260 is a two-dimensional map. The current setpoint configuration measurement 212 is represented as a coordinate point which corresponds to the engine rotational speed presented on the X axis in percentage, and the BOV discharge pressure presented on the Y axis in PSI.

In one example, the current setpoint configuration 212 is: rotational engine speed 94%, and BOV discharge pressure 1 PSI. The current setpoint configuration 212 is marked as a star on the map 260 of FIG. 4. The map 260 includes several response surfaces 262, and each response surface 262 is associated with one corresponding adjustment factor 222. In one embodiment, the maps 260 and the response surfaces 262 are pre-computed and generated using experimental data, numerical data generated from, for example, a physics-based model of the gas turbine engine 100, or from a combination of experimental and numerical data. The adjustment estimator 216 is thus calibrated from experimental data, numerical data generated from, for example, a physics-based model of the gas turbine engine 100, or from a combination of experimental and numerical data.

As seen on FIG. 4, the current setpoint configuration 212 lies on the response surface 262 associated with the adjustment factor 222 of "Adjust Orifice by −1 class". The adjustment estimator 216 thus outputs that the adjustment factor 222 is "Adjust orifice by −1 class" in this example. The final setpoint configuration 232 is determined based on the current setpoint configuration and the adjustment factor 222. In one example, the current setpoint configuration 212 is "Orifice class 19". The final setpoint configuration 232 is determined by combining "Orifice class 19" with "Adjust orifice by −1 class". In the present example, the final setpoint configuration 232 is thus "Class 18 to install". The modulation characteristic of the BOV can then be adjusted as the final setpoint configuration 232 is "Class 18".

Using the present method 200 relying on the current setpoint configuration 212 and the operating conditions 214 of the gas turbine engine 100 and the multi-dimensional maps 260, maintenance personnel can adjust the modulation characteristic associated with a setpoint of the BOV in a number of steps that is reduced compared to conventional methods for adjusting the modulation characteristic of the BOV, which typically require iterative adjustments of the BOV setpoint configuration to get to the final setpoint configuration 232. The costs associated with maintenance time and fuel burnt are reduced using the present method 200 compared to conventional methods for adjusting the modulation characteristic of the BOV.

Figure 5:
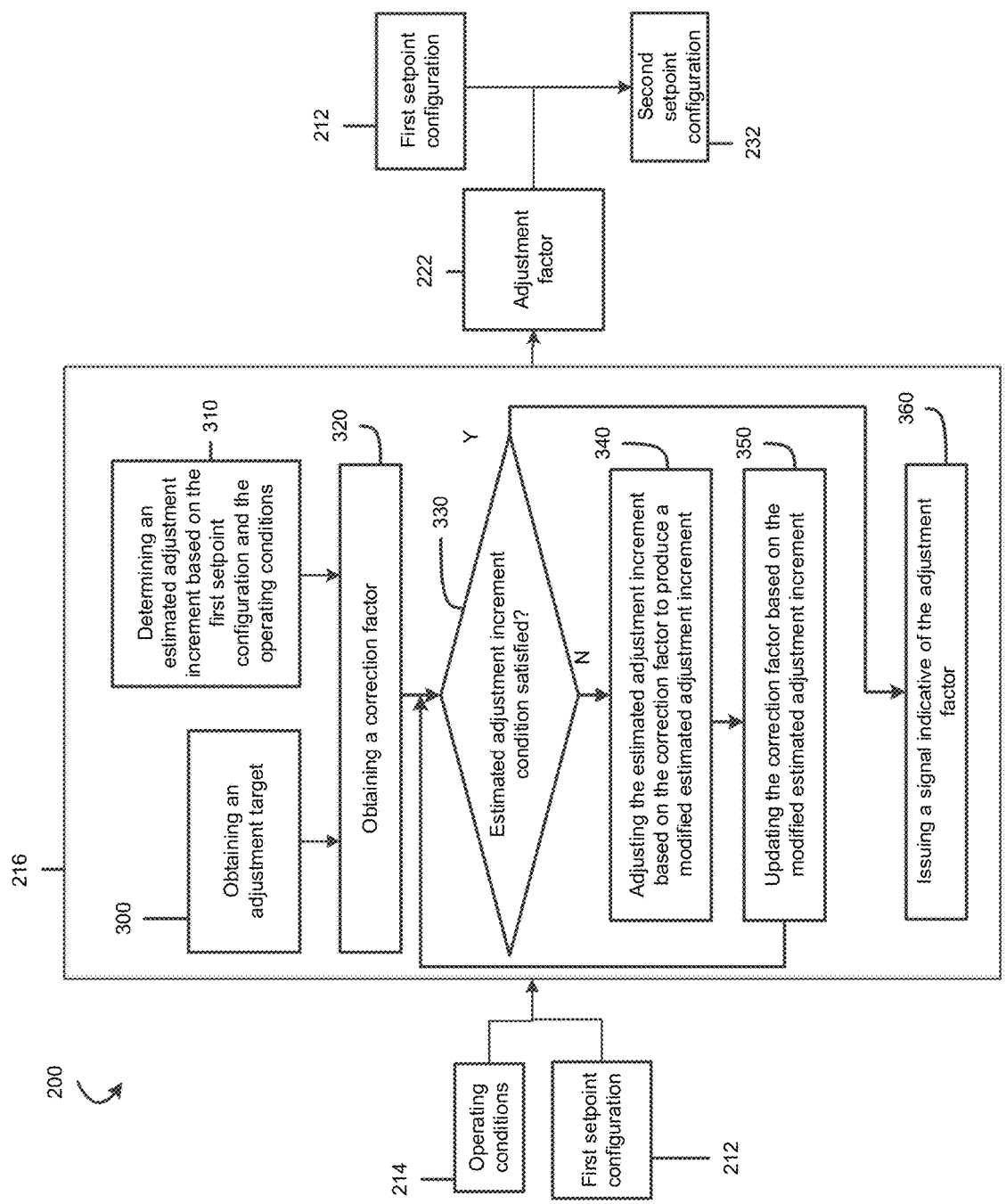
Figure 6:
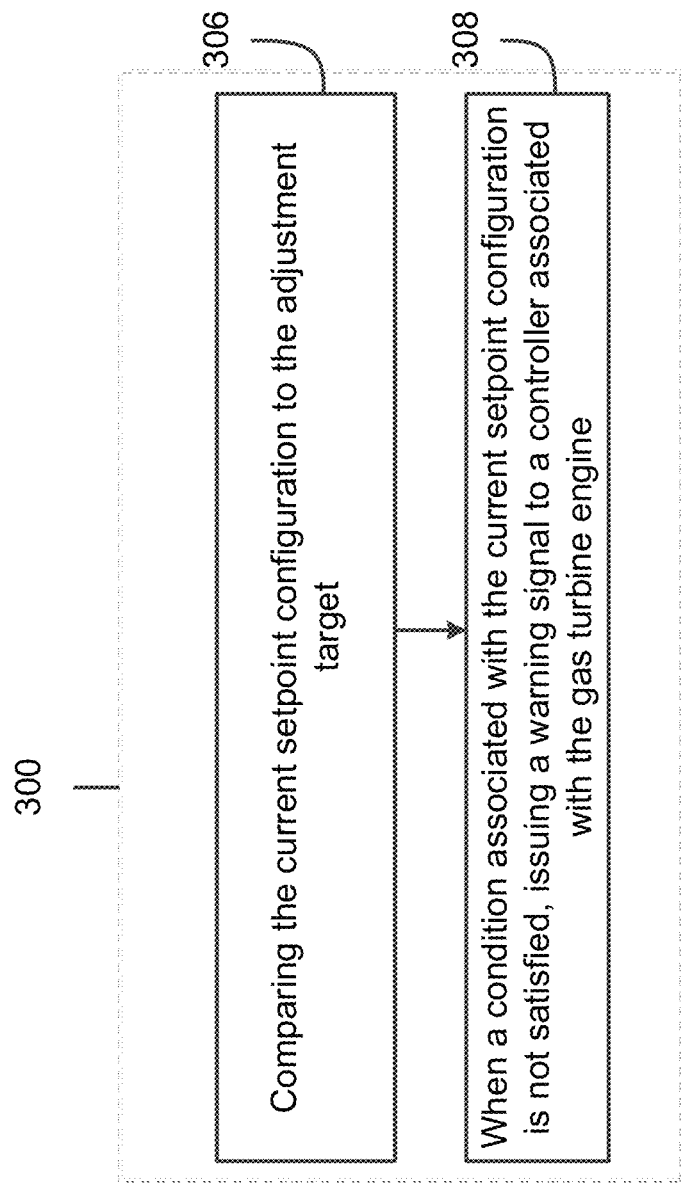
Figure 7:
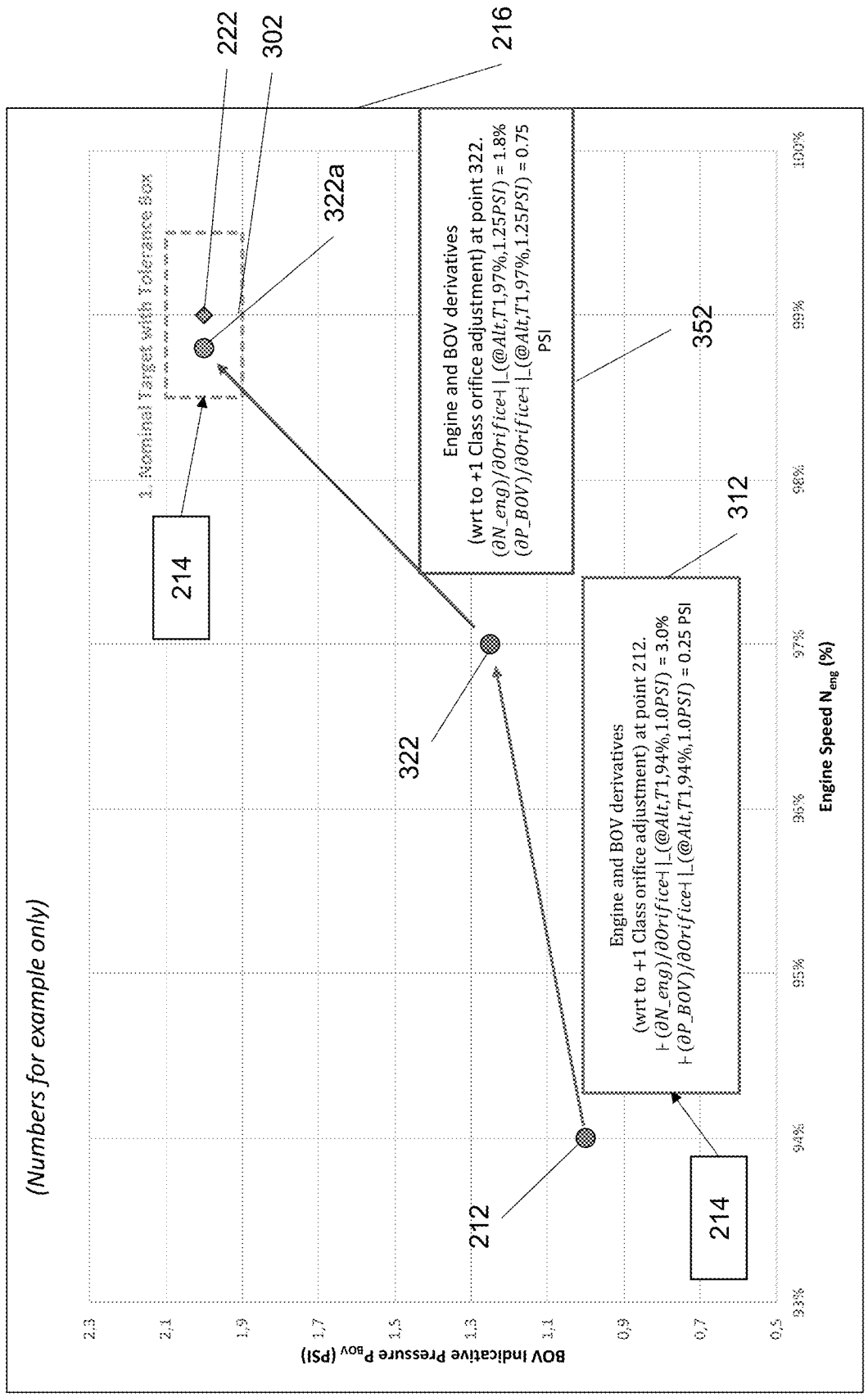

Referring to FIGS. 5 to 7, another example embodiment of the adjustment estimator 216 is presented. In the illustrated embodiment, at step 300, the adjustment estimator 216 obtains an adjustment target 302. In one embodiment, the adjustment target 302 comprises the adjustment factor 222 and a predetermined tolerance around the adjustment factor 222 (as shown in dashed line in FIG. 6). In one embodiment, the adjustment target 302 is determined by the adjustment estimator 216 based on the operating conditions 214 of the gas turbine engine 100. For example, the adjustment target 302 is determined based on current altitude and engine inlet temperature. Referring to FIG. 6, in one embodiment, the step 300 further includes, at step 306, comparing the current setpoint configuration 212 to the adjustment target 302. At step 308, in response to determining that a condition associated with the current setpoint configuration 212 is not satisfied (e.g. the current setpoint configuration 212 is outside a predetermined range of the adjustment target 302), a warning signal is issued to a controller associated with the gas turbine engine 100, such as the valve controller 102. The warning signal may be retrieved, for example by being displayed in a cockpit of an aircraft associated with the gas turbine engine 100 or saved in a memory of the valve controller 102, to conduct and direct maintenance procedure to adjust the modulation characteristic of the BOV.

Referring back to FIG. 5, at step 310, the method 200 includes determining an estimated adjustment increment 312 of the BOV based on the current setpoint configuration 212 and the operating conditions 214 of the gas turbine engine 100. In one embodiment, the estimated adjustment increment 312 of the BOV is determined by evaluating partial derivatives with respect to a minimum adjustment increment (e.g. one orifice class) at the current setpoint configuration 212 and at the operating conditions 214. In one embodiment, the partial derivatives are obtained from physics-based calculation and/or from BOV and gas turbine engine 100 experimental data encompassing various operating conditions. The adjustment estimator 216 is thus calibrated from the physics-based calculations (i.e. numerical data) and/or from experimental data. An example of the partial derivatives approach is presented in FIG. 7, with the current setpoint configuration 212 being: engine speed 94%; BOV indicative pressure 1.0 PSI.

In another embodiment, the estimated adjustment increment 312 of the BOV is determined using gradient vector descent method. In yet another embodiment, the estimated adjustment increment 312 of the BOV is determined using a neural network trained with experimental data, and where the neural network has established a relationship between a desired bleed-off valve modulation characteristic and various BOV configuration setpoints. In such an embodiment, the adjustment increment 312 provided by the adjustment estimator is calibrated from experimental data.

At step 320, the method 200 includes obtaining a correction factor 322. As seen in the example of FIG. 7, the correction factor 322 is obtained by comparing (i.e. adding) the estimated adjustment increment 312 to the current setpoint configuration 212. The correction factor 322 is then applied (i.e. added) to the current setpoint configuration 212 and becomes coordinate point: engine speed 97%; BOV indicative pressure 1.25 PSI.

At decision step 330, the method 200 includes determining whether the correction factor 322 satisfies a condition associated with the estimated adjustment increment 312. In some embodiments, the condition associated to the correction factor 322 is satisfied when the estimated adjustment increment 312 and the adjustment target 302 sufficiently match, for instance such that the correction factor 322 is within a particular range, and/or within the predetermined tolerance around the adjustment factor 222. When the condition associated with the estimated adjustment increment 312 is satisfied, the method 200 moves to step 360.

When the correction factor 322 does not satisfy the condition associated with the estimated adjustment increment 312, the method 200 moves to step 340. At step 340, the method 200 includes adjusting the estimated adjustment increment 312 based on the correction factor 322 to produce a modified estimated adjustment increment 352. Since the correction factor 322 is an indicator of the mismatch between the estimated adjustment increment 312 and the adjustment target 302, it is also indicative of whether or not the estimated adjustment increment 312 is a suitable estimate of the adjustment target 302. As a result, the estimated adjustment increment 312 can be modified, or put differently, re-estimated, based on the correction factor 322 to generate the modified estimated adjustment increment 352. In the example presented in FIG. 7, the modified adjustment increment 352 is re-estimated at the correction factor 322, and the modified adjustment increment 352 is output as: engine speed 1.8%; BOV indicative pressure 0.75 PSI.

At step 350, the method 200 includes updating the correction factor 322 based on the modified estimated adjustment increment 352. The correction factor 322 can be updated by adding the modified estimated adjustment increment 312 to the correction factor 322. Step 330 can then be performed anew using the new correction factor 322. Until the correction factor 322 satisfies the condition associated with the estimated adjustment increment 312, the method 200 will continue looping through steps 330, 340, and 350. Once the correction factor 322 satisfies the condition associated with the estimated adjustment increment 312, the method 200 moves from decision step 330 to step 360. In the example of FIG. 7, the new correction factor 322a is: engine speed 98.8%; BOV indicative pressure 2.0 PSI. The new correction factor 322a is within the predetermined tolerance around the adjustment factor 222.

At step 360, the method 200 includes issuing a signal indicative of the adjustment factor 222. The signal can be issued, for example, via the valve controller 102 associated with the engine 100. In the example of FIG. 7, the new correction factor 322a was obtained using two partial derivatives iterations, and the signal indicative of the adjustment factor 222 is representative of the two minimum increment adjustments (i.e. +2 Class orifice). With the adjustment factor 222, the final setpoint configuration 232 can be obtained using the current setpoint configuration 212. The modulation characteristic of the BOV can then be adjusted to the second modulation characteristic.

Figure 8:
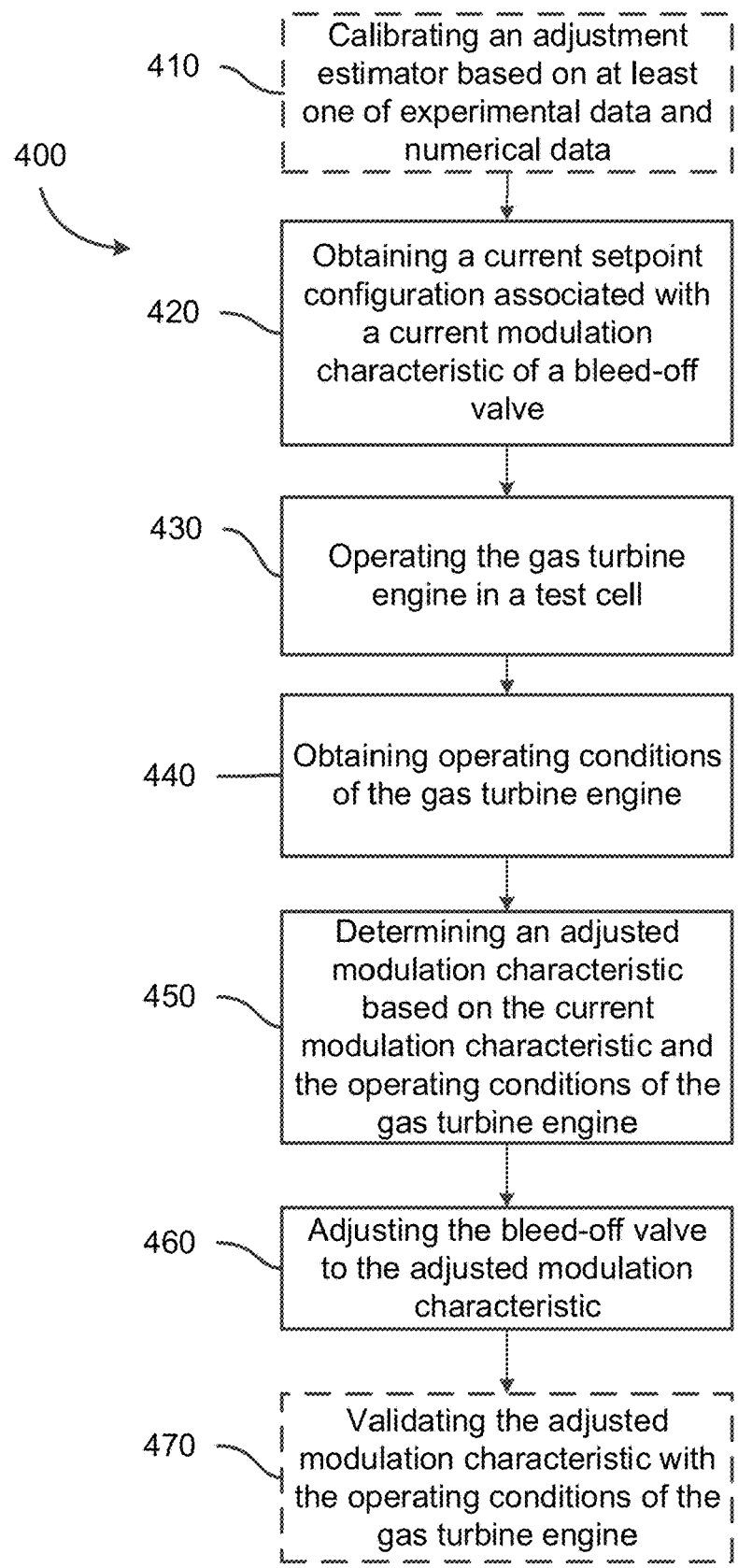
FIG. 8 is a flowchart of a method for testing operation of a gas turbine engine.

Referring to FIG. 8, a method 400 for testing operation of the gas turbine engine 100 is illustrated. The method 400 is intended to be performed in a test cell capable of providing a range of operating conditions to the gas turbine engine 100 in order to adjust a modulation characteristic of the BOV. The method 400 includes calibrating the adjustment estimator 216 based on experimental and/or numerical data at 410. A current setpoint configuration associated with a current modulation characteristic of the BOV is obtained at 420 by the adjustment estimator 216. The gas turbine engine 100 is operated in a test cell at given operating conditions at 430. The operating conditions of the gas turbine engine 100 are obtained at 440 by the adjustment estimator 216. At 450, the method 400 includes determining an adjusted modulation characteristic based on the current modulation characteristic of the BOV and the operating conditions of the gas turbine engine 100. Step 450 is performed at the adjustment estimator 216 in accordance with one or a combination of the techniques described above. At 460, the BOV is adjusted to the adjusted modulation characteristic. At 470, the adjusted modulation characteristic is validated with the operating conditions of the gas turbine engine 100 to confirm that the adjusted modulation characteristic is appropriate for, for example, the expected operating conditions of the gas turbine engine 100.

Figure 9:
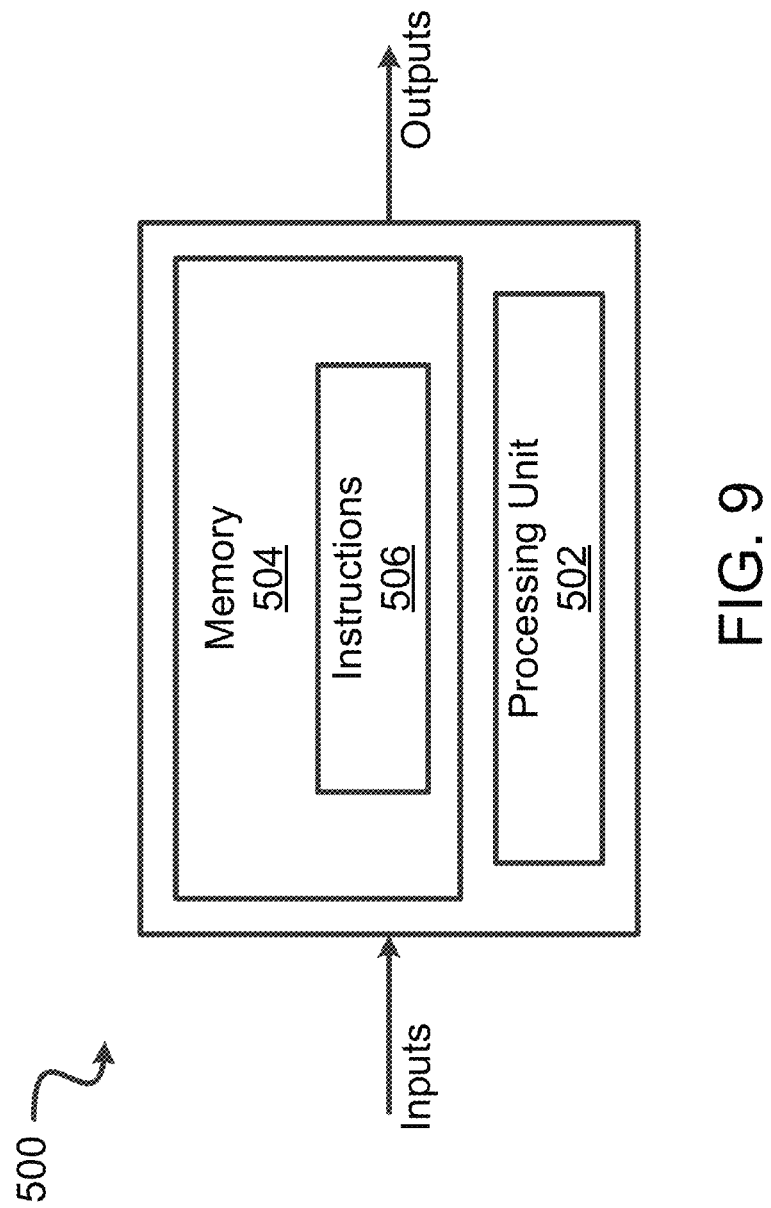
FIG. 9 is a block diagram of an example computing device for implementing a system for adjusting a modulation characteristic of a bleed-off valve; and It will be noted that throughout the appended drawings, like features are identified by like reference numerals.

In some embodiments, the valve controller 102 can be implemented as a computing device 500 as illustrated in FIG. 9, as part of the engine controller 104 or separately therefrom. Indeed, the computing device 500 can form part or all of the engine controller 104. In some embodiments, the computing device 500 is within the engine controller 104 and cooperates with other hardware and/or software components therein. In such cases, the engine controller 104 controls operation of the BOV(s). In some embodiments, the computing device 500 is external to the engine controller 104 and interacts with the engine controller 104, for example to obtain the status of the engine and/or the compressor spool acceleration values. In some embodiments, some hardware and/or software components are shared between the engine controller 104 and the computing device 500, without the computing device 500 being integral to the engine controller 104. In this case, the engine controller 104 can perform part of the steps for controlling the BOV(s).

The computing device 500 comprises a processing unit 502 and a memory 504 which has stored therein computer-executable instructions 506. The processing unit 502 may comprise any suitable devices configured to cause a series of steps to be performed such that instructions 506, when executed by the computing device 500 or other programmable apparatus, may cause functions/acts/steps described herein to be executed. The processing unit 502 may comprise, for example, any type of general-purpose microprocessor or microcontroller, a digital signal processing (DSP) processor, a CPU, an integrated circuit, a field programmable gate array (FPGA), a reconfigurable processor, other suitably programmed or programmable logic circuits, or any combination thereof.

The memory 504 may comprise any suitable known or other machine-readable storage medium. The memory 504 may comprise non-transitory computer readable storage medium, for example, but not limited to, an electronic, magnetic, optical, electromagnetic, infrared, or semiconductor system, apparatus, or device, or any suitable combination of the foregoing. The memory 504 may include a suitable combination of any type of computer memory that is located either internally or externally to device, for example random-access memory (RAM), read-only memory (ROM), electro-optical memory, magneto-optical memory, erasable programmable read-only memory (EPROM), and electrically-erasable programmable read-only memory (EEPROM), Ferroelectric RAM (FRAM) or the like. Memory 504 may comprise any storage means (e.g., devices) suitable for retrievably storing machine-readable instructions 506 executable by processing unit 502. The steps for the method 200 may be embodied as instructions 506 stored in memory 504 of the computing device 500.

The methods and systems for adjusting a modulation characteristic of a BOV of a gas turbine engine described herein may be implemented in a high level procedural or object oriented programming or scripting language, or a combination thereof, to communicate with or assist in the operation of a computer system, for example the computing device 500. Alternatively, the methods and systems for adjusting a modulation characteristic of a BOV may be implemented in assembly or machine language. The language may be a compiled or interpreted language. Program code for implementing the methods and systems for adjusting a modulation characteristic of a BOV may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for adjusting a modulation characteristic of a BOV may also be considered to be implemented by way of a non-transitory computer-readable storage medium having a computer program stored thereon. The computer program may comprise computer-readable instructions which cause a computer, or more specifically the processing unit 502 of the computing device 500, to operate in a specific and pre-defined manner to perform the functions described herein, for example those described in the method 200.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described in this document provide non-limiting examples of possible implementations of the present technology. Upon review of the present disclosure, a person of ordinary skill in the art will recognize that changes may be made to the embodiments described herein without departing from the scope of the present technology.

The invention claimed is:

1. A method for adjusting a modulation characteristic of a bleed-off valve of a gas turbine engine, the method comprising:
    obtaining a first setpoint configuration associated with a first modulation characteristic of the bleed-off valve;
    obtaining operating conditions of the gas turbine engine;
    determining an adjustment factor based on the first setpoint configuration and the operating conditions of the gas turbine engine; and
    adjusting the bleed-off valve to a second setpoint configuration associated with a second modulation characteristic based on the first setpoint configuration and the adjustment factor, the second modulation characteristic being different from the first modulation characteristic.

2. The method of claim 1, wherein the adjusting to the second setpoint configuration of the bleed-off valve includes adjusting an adjustment device of the bleed-off valve.

3. The method of claim 2, wherein the adjusting of the adjustment device includes at least one of: changing an orifice class of the bleed-off valve, changing a seat class of the bleed-off valve, turning an adjustment screw on the bleed-off valve, changing a classified baffle of the bleed-off valve, and changing a spring stiffness of the bleed-off valve.

4. The method of claim 1, wherein the obtaining the first setpoint configuration and the obtaining of the operating conditions of the gas turbine engine includes testing the gas turbine engine in a test cell.

5. The method of claim 1, further comprising outputting the second setpoint configuration associated with the second modulation characteristic.

6. The method of claim 1, wherein the bleed-off valve is positioned in a compressor section of the gas turbine engine, and is configured for removing excess air pressure from the compressor section.

7. The method of claim 1, wherein the determining of the adjustment factor includes using a plurality of multi-dimensional maps associated with the operating conditions of the gas turbine engine, the plurality of multi-dimensional maps defining the adjustment factor as a function of the operating conditions of the gas turbine engine.

8. The method of claim 7, wherein each multi-dimensional map of the plurality of multi-dimensional maps is associated with a set of the operating conditions of the gas turbine engine.

9. The method of claim 7, wherein each multi-dimensional map of the plurality of multi-dimensional maps is a two-dimensional map including a plurality of response surfaces, each response surface of the plurality of response surfaces associated with one corresponding adjustment factor.

10. The method of claim 1, wherein the operating conditions of the gas turbine engine comprise engine inlet pressure, engine inlet temperature, and rotational engine speed.

11. The method of claim 1, wherein the determining of the adjustment factor comprises:
   obtaining an adjustment target;
   determining an estimated adjustment increment based on the first setpoint configuration and the operating conditions of gas turbine engine;
   comparing the estimated adjustment increment to the adjustment target to obtain a correction factor;
   when a condition associated with the estimated adjustment increment is not satisfied:
      adjusting the estimated adjustment increment based on the correction factor to produce a modified estimated adjustment increment, and
      updating the correction factor based on the modified estimated adjustment increment; and
   when the condition associated with the estimated adjustment increment is satisfied, issuing a signal indicative of the adjustment factor.

12. The method of claim 11, wherein the adjustment target is determined based on the operating conditions of the gas turbine engine.

13. The method of claim 1, further comprising:
   obtaining an adjustment target;
   comparing the first setpoint configuration to the adjustment target; and
   when a condition associated with the first setpoint configuration is not satisfied, issuing a warning signal to a controller associated with the gas turbine engine.

* * * * *